(12) United States Patent
Kuskin et al.

(10) Patent No.: US 7,609,722 B2
(45) Date of Patent: Oct. 27, 2009

(54) METHOD AND APPARATUS FOR TRANSMITTING AND RECEIVING COMPRESSED FRAME OF DATA OVER A WIRELESS CHANNEL

(75) Inventors: Jeffrey S. Kuskin, Mountain View, CA (US); Jeffrey M. Gilbert, Sunnyvale, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 965 days.

(21) Appl. No.: 10/367,663

(22) Filed: Feb. 14, 2003

(65) Prior Publication Data

US 2004/0160983 A1   Aug. 19, 2004

(51) Int. Cl.
*H04J 3/22* (2006.01)
(52) U.S. Cl. .................. 370/471; 370/392; 370/395.32; 370/474; 341/51; 341/87
(58) Field of Classification Search ................. 370/392, 370/395.32, 471, 474; 341/51, 87
See application file for complete search history.

(56) References Cited

U.S. PATENT DOCUMENTS

| 349,526 | A |   | 9/1886 | Seavey | |
|---|---|---|---|---|---|
| 445,805 | A |   | 2/1891 | Entrekin | |
| 596,312 | A |   | 12/1897 | Badgley | |
| 2,052,178 | A |   | 8/1936 | Holden | |
| 4,558,302 | A | * | 12/1985 | Welch | 341/51 |
| 5,150,119 | A | * | 9/1992 | Yoshida et al. | 341/51 |
| 5,389,993 | A |   | 2/1995 | Adolphi et al. | |
| 5,406,278 | A | * | 4/1995 | Graybill et al. | 341/51 |
| 5,475,460 | A |   | 12/1995 | Stephenson et al. | |
| 5,483,556 | A | * | 1/1996 | Pillan et al. | 375/340 |
| 5,684,478 | A | * | 11/1997 | Panaoussis | 341/51 |
| 5,818,830 | A |   | 10/1998 | Daane et al. | 370/347 |
| 5,953,542 | A |   | 9/1999 | Fleming | |
| 5,991,410 | A | * | 11/1999 | Albert et al. | 705/78 |
| 6,021,433 | A |   | 2/2000 | Payne et al. | 709/219 |
| 6,026,082 | A |   | 2/2000 | Astrin | 370/336 |
| 6,041,227 | A |   | 3/2000 | Sumner | 455/412 |
| 6,146,238 | A |   | 11/2000 | Daiber | |
| 6,292,115 | B1 | * | 9/2001 | Heath | 341/87 |
| 6,489,902 | B2 | * | 12/2002 | Heath | 341/87 |
| 6,496,477 | B1 |   | 12/2002 | Perkins et al. | 370/228 |

(Continued)

OTHER PUBLICATIONS

Franaszek et al. "Algorithms and data structures for compressed-memory machines" (IBM J. Res. & Dev. vol. 45, No. 2, Mar. 2001; pp. 245-258.

(Continued)

*Primary Examiner*—William Trost, IV
*Assistant Examiner*—Toan D Nguyen
(74) *Attorney, Agent, or Firm*—Bever, Hoffman & Harms, LLP; Jeanette S. Harms

(57) ABSTRACT

A transmitting apparatus and method is described that determines, on a frame-by-frame basis, whether to transmit a compressed frame or a non-compressed frame, depending upon whether the compressed frame or the non-compressed frame will actually be smaller in size. The frame that is smaller is indicated for transmission, with a header of the frame being adapted to include a compression flag indicating whether that frame is the compressed or the non-compressed frame. After wireless transmission and reception, the received frame is, if needed, decompressed if so indicated by the compression flag.

12 Claims, 6 Drawing Sheets

U.S. PATENT DOCUMENTS

| | | |
|---|---|---|
| 6,856,599 B1 * | 2/2005 | Kroon .................... 370/236 |
| 6,873,608 B1 * | 3/2005 | Plotnik et al. ............ 370/328 |
| 2001/0054131 A1 * | 12/2001 | Alvarez et al. ........... 711/105 |
| 2004/0025391 A1 | 2/2004 | Storm |
| 2004/0259667 A1 | 12/2004 | Berdugo et al. |
| 2005/0181352 A1 | 8/2005 | Shephard et al. |

OTHER PUBLICATIONS

Tremaine et al. "IBM memory expansion technology (MXT)" (IBM J. Res. & Dev. vol. 45, No. 2, Mar. 2001; pp. 271-285).

* cited by examiner

METHOD AND APPARATUS FOR TRANSMITTING AND RECEIVING COMPRESSED FRAME OF DATA OVER A WIRELESS CHANNEL

FIELD OF THE INVENTION

The present invention relates to an apparatus and method for transmitting and receiving compressed frames of data over a wireless channel.

BACKGROUND OF THE RELATED ART

Compression and decompression of data is used in many types of communication systems.

In wireless communication systems, data is typically compressed prior to being formatted into a frame for transmission (such as with the compression of voice data), but once the data is formatted for transmission as a frame, then that data is typically transmitted across a wireless channel for reception by a receiver.

Systems do exist, however, in which data that has been formatted into a frame for transmission across the wireless channel is compressed. For example, U.S. Pat. No. 6,496,477 describes a system in which all frames are compressed using one of two compression techniques. The '477 patent does not, however, suggest advantages of the present invention described hereinafter.

SUMMARY OF THE INVENTION

The present invention relates to an apparatus and method for transmitting and receiving compressed frames of data over a wireless channel.

In a preferred embodiment, a transmitting apparatus and method determines, on a frame-by-frame basis, whether to transmit a compressed frame or a non-compressed frame, depending upon whether the compressed frame or the non-compressed frame will actually be smaller in size. The frame that is smaller is indicated for transmission, with a header of the frame being adapted to include a compression flag indicating whether that frame is the compressed or the non-compressed frame. After wireless transmission and reception, the received frame is, if needed, decompressed if so indicated by the compression flag.

According to one aspect of the invention, the determination of whether to transmit a compressed frame or a non-compressed frame is made on a frame by frame basis.

In another aspect of the invention, only the data portion of the frame may be compressed, with the header portion of the frame not being compressed.

In a further aspect of the invention, the transmission apparatus and the reception apparatus are implemented in hardware, using logic, thereby freeing a wireless processor from needing to perform tasks relating to the determination of whether to compress, and the actual compression and decompression that may take place.

In a further aspect of the invention, encryption and decryption are included, with the encryption being included after the determination of whether to use the compressed or non-compressed frame is made, and with the decryption taking place prior to the decompression, if needed, being performed.

BRIEF DESCRIPTION OF THE DRAWINGS

The above and other features and advantages of the present invention are further described in the detailed description which follows, with reference to the drawings by way of non-limiting exemplary embodiments of the present invention, wherein like reference numerals represent similar parts of the present invention throughout several views and wherein.

DETAILED DESCRIPTION OF THE PREFERRED EMBODIMENTS

Figure 1A:
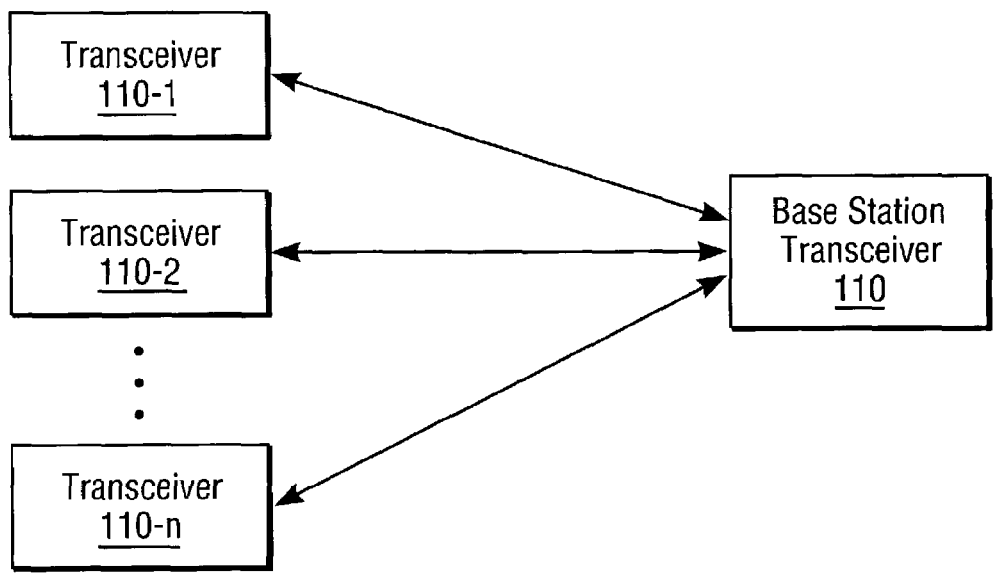
FIGS. 1A and 1B illustrate overviews of communication systems using the present invention.
Figure 1B:
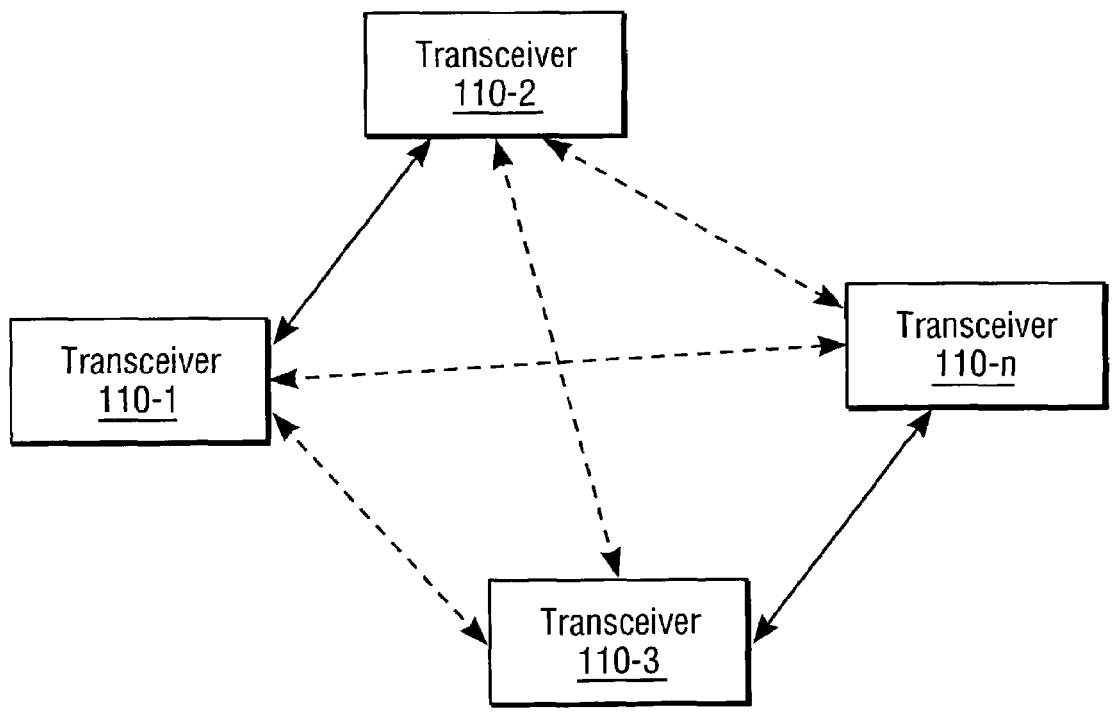

FIGS. 1A and 1B illustrate lock diagrams of a wireless communication systems according to the present invention. The system includes a plurality of transceivers 110. The transceivers can wirelessly communicate in various ways, such as many transceivers with a base station transceiver, as shown in FIG. 1A, or using peer-to-peer communications between various ones of the transceivers, as shown by FIG. 1B, in which the solid lines represent transceivers 110 that are communicating, and the dashed lines indicate communication channels between transceivers 110 that could exist at another time. The above systems are only representative of the various types of systems used, as the present invention can be included within systems that use repeaters and other types of communication devices. Accordingly, the present invention can be implemented irrespective of the particular system used, and as such will be described hereinafter with reference to a transmitter 200 transmitting frames of data to a receiver 300, although it will be understood that the transmitter 200 and the receiver 300, in practice, will each typically be implemented as a transceiver, thereby having both transmit and receive capability.

Further, the present invention can be implemented in conjunction with various types of wireless communication protocols, such as IEEE 802.11 protocols, as well as others.

Figure 2A:
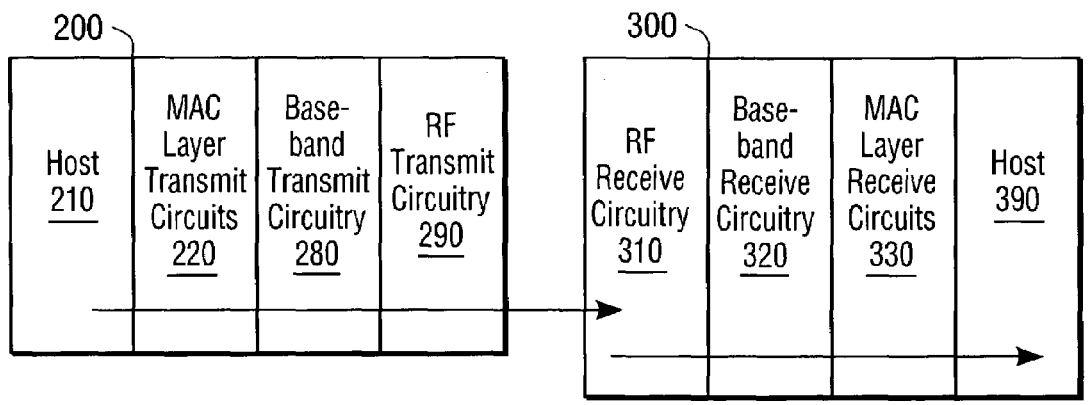
FIGS. 2A-2C illustrate higher level block diagrams of a transmitter and receiver according to the present invention.

FIG. 2A illustrates in further detail the transmitter 200 transmitting frames of data to the receiver 300 across a wireless channel. The arrows shown through transmitter 200 and receiver 300 illustrate the general path of the frames therethrough.

The transmitter 200 includes a host 210, typically a processor, that provides frames of data for transmission to MAC layer transmit components 220 described further hereinafter. Each frame of data, as operated upon by the MAC layer transmit components, directed to baseband processing circuitry 280, and from there to the radio frequency processing circuitry 290, for transmission from the antenna associated with the radio frequency processing circuitry 290 onto the wireless communication channel. The baseband processing circuitry 280 and the radio frequency processing circuitry 290 are conventional, in the sense that many different types of such circuitry can be implemented, and will thus not be further described herein.

With respect to the MAC layer transmit circuitry 220, those circuits that are significant with respect to the present invention will be described, although it is understood that additional circuits will be included in a transmitter that will accommodate other functionalities. For example, the MAC layer circuitry may also include a processor that performs MAC layer functions other than the compression that is performed by the compression engine 230, and this processor may operate based upon received instructions. Further, this processor may be shared by the host 210 and perform functions normally associated with the host, as is known. In contrast, the compression engine 230, as described, preferably uses parallel circuits, not a processor that uses received instructions.

Figure 2B:
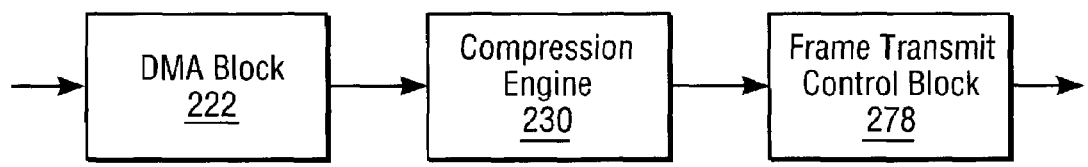

With respect to the present invention, the MAC layer transmit circuitry of note, as illustrated in FIG. 2B, include the direct memory access (DMA) block 222, the compression engine 230, and the frame transmit control block 278. The host 210 will pass a frame of data to the DMA block 222, which will then cause this frame of data, which is uncompressed, to be passed to the compression engine 230. The compression engine 230 will pass data that has been operated upon, which may or may not be compressed, and for purposes of description herein will be referred to as possibly compressed data, to the frame transmit control block 278, which will cause the frame to be included with other header data, and then passed to the baseband processing circuitry 280. It is also noted that the MAC layer The receiver 300 includes radio frequency reception circuitry 310, baseband receive processing circuitry 320, and MAC layer receive components 330, and a receive host 390, which is typically a processor. The frequency reception circuitry 310 and the baseband receive processing circuitry 320 are conventional, in the sense that many different types of such circuitry can be implemented, and will thus not be further described herein.

Figure 2C:
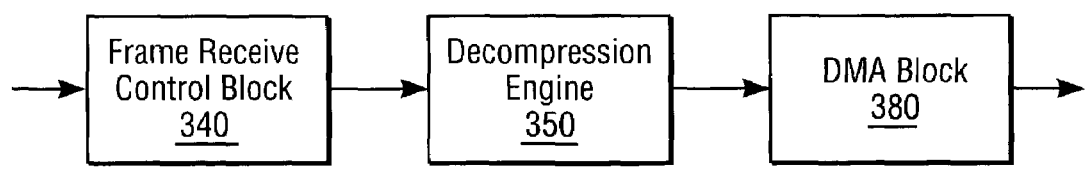

With respect to the MAC layer receive components 330, those that are significant with respect to the preferred embodiment of the present invention, as illustrated in FIG. 2C, include the frame receive control block 340, the decompression engine 350, and the DMA block 380. The frame receive control block 340 receives an entire frame of potentially compressed data, which frame, as described herein, will include in its header portion a flag indicating whether the potentially compressed frame data is compressed or non-compressed. The potentially compressed frame data is passed to the decompression engine 350, where, if is compressed it is then decompressed, as described further herein, and then passed to the DMA block 380 so that it can be passed to the host 390 at the appropriate time.

It is noted that the compression engine 230 and the associated decompression engine 350 will implement one type of compression on a given frame, but different frames can be compressed using one of multiple different types of compression, or no compression, if desired. To the extent that more than one type of compression may be implemented, the compression flag will need to have an appropriate bit size so that the decompression engine 350 can recognize the type of compression that exists on the incoming potentially compressed frame data.

Figure 3A:
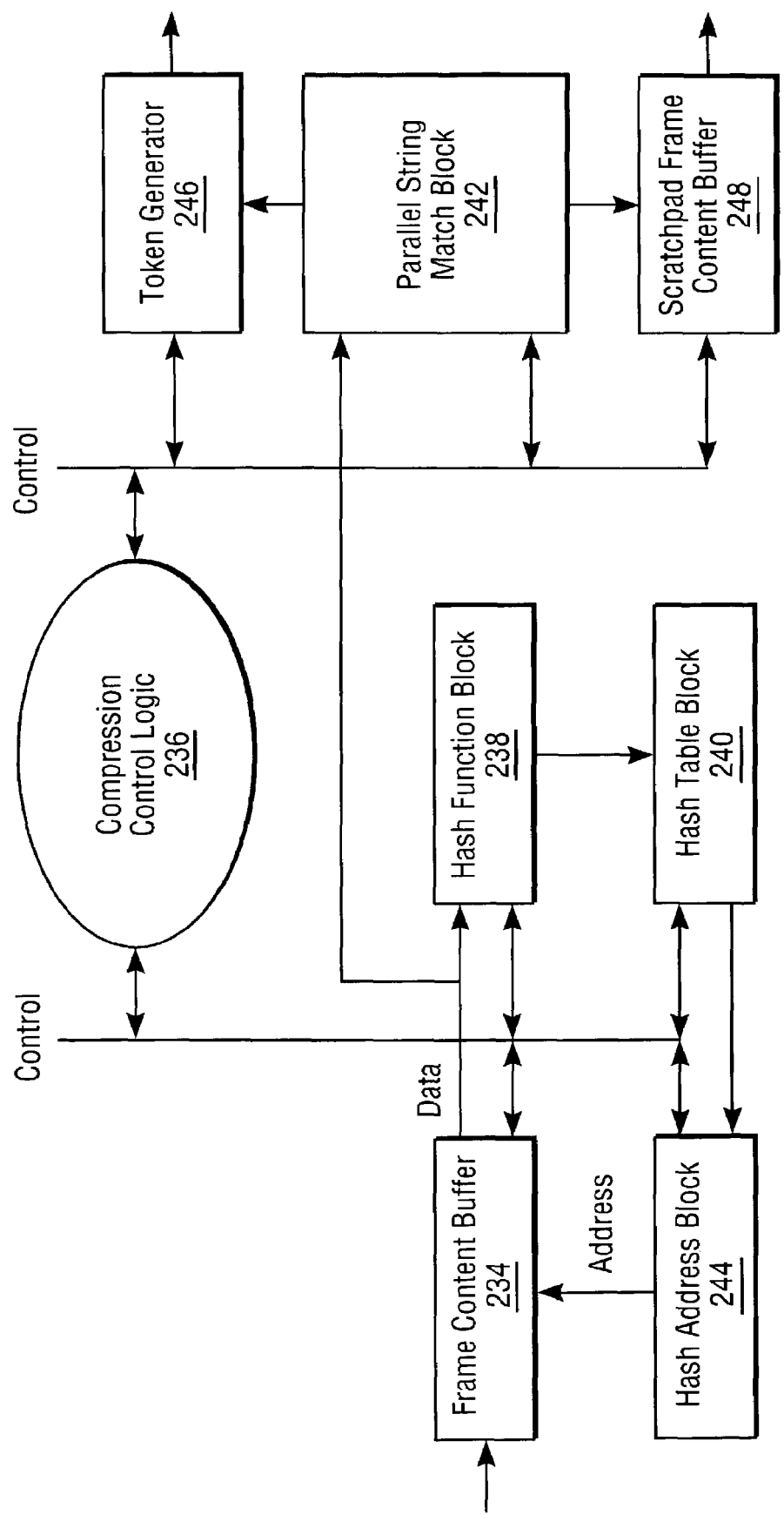
FIG. 3A illustrates a more detailed illustration of the hardware within the transmitter that is used to implement compression according to the present invention.

FIG. 3A illustrates a block diagram of a preferred compression engine 230 according to the present invention using a single compression technique implemented in hardware, which is preferred, it is understood that other compression techniques could be implemented, also preferably in hardware as this preferred embodiment, but also in software or some combination thereof. Further, the compression engine 230 as described is optimized to operate on frames that are wirelessly transmitted over a channel, which are typically between 500-2000 bytes, although frames of other sizes can be implemented.

Prior to describing the operation of the compression engine 230, the hardware components that make up compression engine 230 will first be identified. Frame content buffer 234 is used to store the current frame on which compression is to be attempted, and will typically be buffer memory allocated specifically for the compression engine 230. Compression control logic 236 controls the sequence of operations, as discussed hereinafter, and is implemented preferably as logic gates. Hash function block 238 is used to take the hash function of certain portions of the frame, such as one to five bytes of data, with three bytes of data being found preferable. The hash function block can implement any conventional hash function, but a hash function that is simple and fast to implement in hardware, as well as works well across a variety of frame contents is desirable Hash table block 240 is a table that is built up of the obtained has functions, The hash table 240 is preferably flushed after each frame is operated upon, and then rebuilt using portions of the data of the next frame that needs to be compressed. The hash table 240 is built up by associating the hash functions with various address within the frame content buffer 234. Ideally, all hash values are preserved. However, since each hash table entry can store only 6 frame index values, it's possible for a hash table entry to overflow, and in this case the oldest frame index value is overwritten with the frame index value being inserted.

In the preferred embodiment shown, each hash function is associated with six possible addresses within the frame content buffer 234, with the addresses typically being stored using a relative index, and the six addresses indicating the six likeliest candidates for a match between the data that has just been hashed, and data that has previously been used to create the hash table 240.

Hash address block 244 stores the six addresses that are the likely candidates for a match.

Parallel string match logic block 242 performs parallel matching between the string of data that is currently being operated upon and each of the six match candidate strings, which are obtained from the six addresses stored in the hash address block 244, which in the preferred embodiment is 32 bits of data. As illustrated in more detail in FIG. 3B, the parallel string match logic block 242 includes six parallel string match circuits 242-1 that each compare the search string and the match string. The matches obtained are each fed to the selection block 242-2, which selects the best match of the six and generates generate a signal indicating that a match is valid, and the bit length of the match, as described hereinafter. Further, the inputs of the hash entry and the head value are used in order to associate the hash with matches and build up the hash table. In addition, the hash entry and head value are used in the case that multiple matches occur that are of the same length, in which case it is preferable to select the match that is closest to the end of the frame, and the head value indicates which of the hash entry indices should be selected in this situation.

A token generator 246 is used to create a token, also referred to as a compression flag, which will be used to indicate if compression is used (when only a single compression scheme is attempted) or which compression scheme, if any, is used (when a number of different compression schemes are attempted).

Scratchpad frame content buffer 248 is used to store the compressed frame.

Using the above hardware, preferably all being implemented on a single semiconductor chip along with other components of the transceivers 110, the operation of the compression engine will now be described, with further reference to the flowchart in FIG. 4.

Figure 3B:
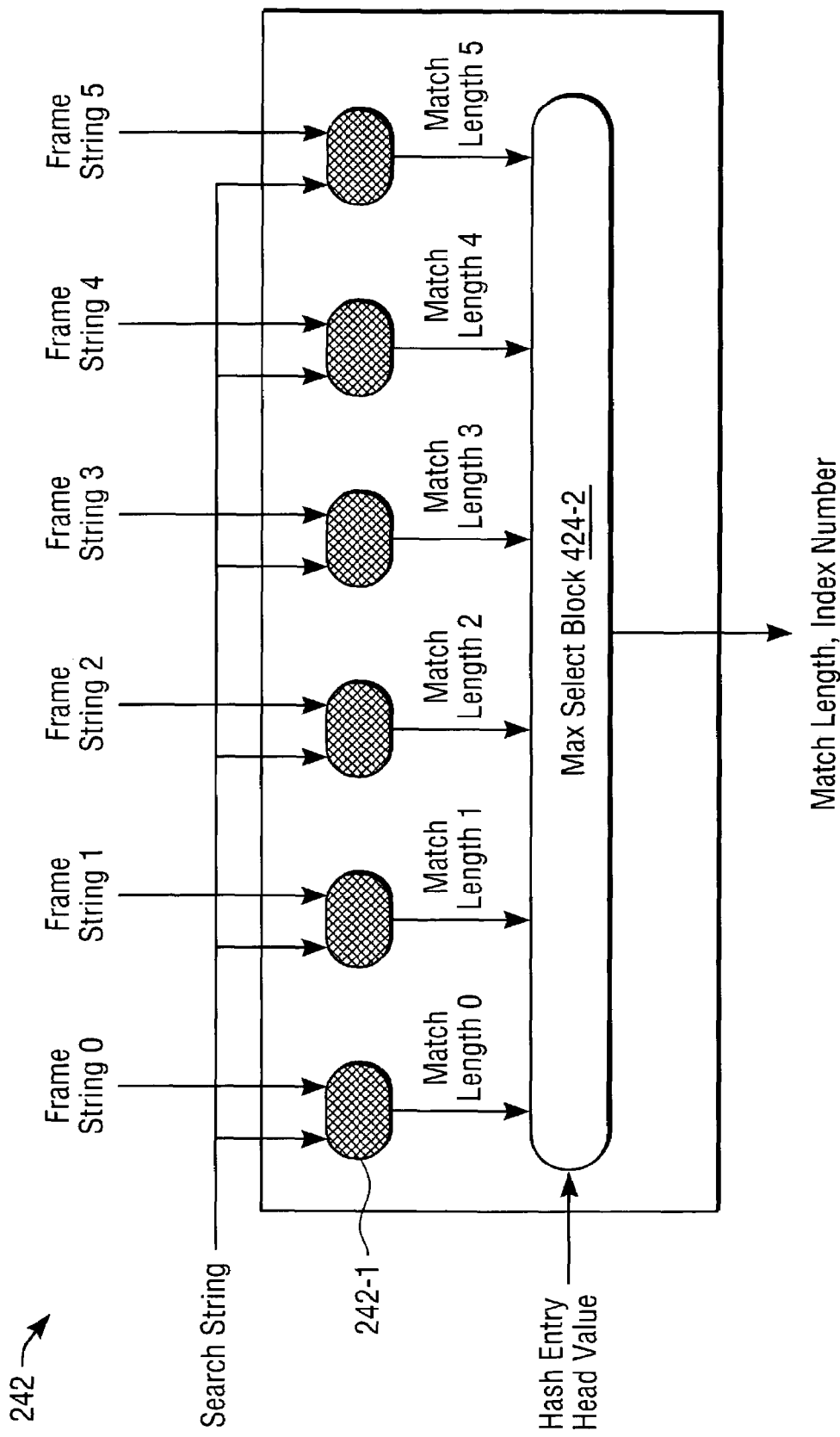
FIG. 3B illustrates the parallel string match logic block according to the present invention.
Figure 4:
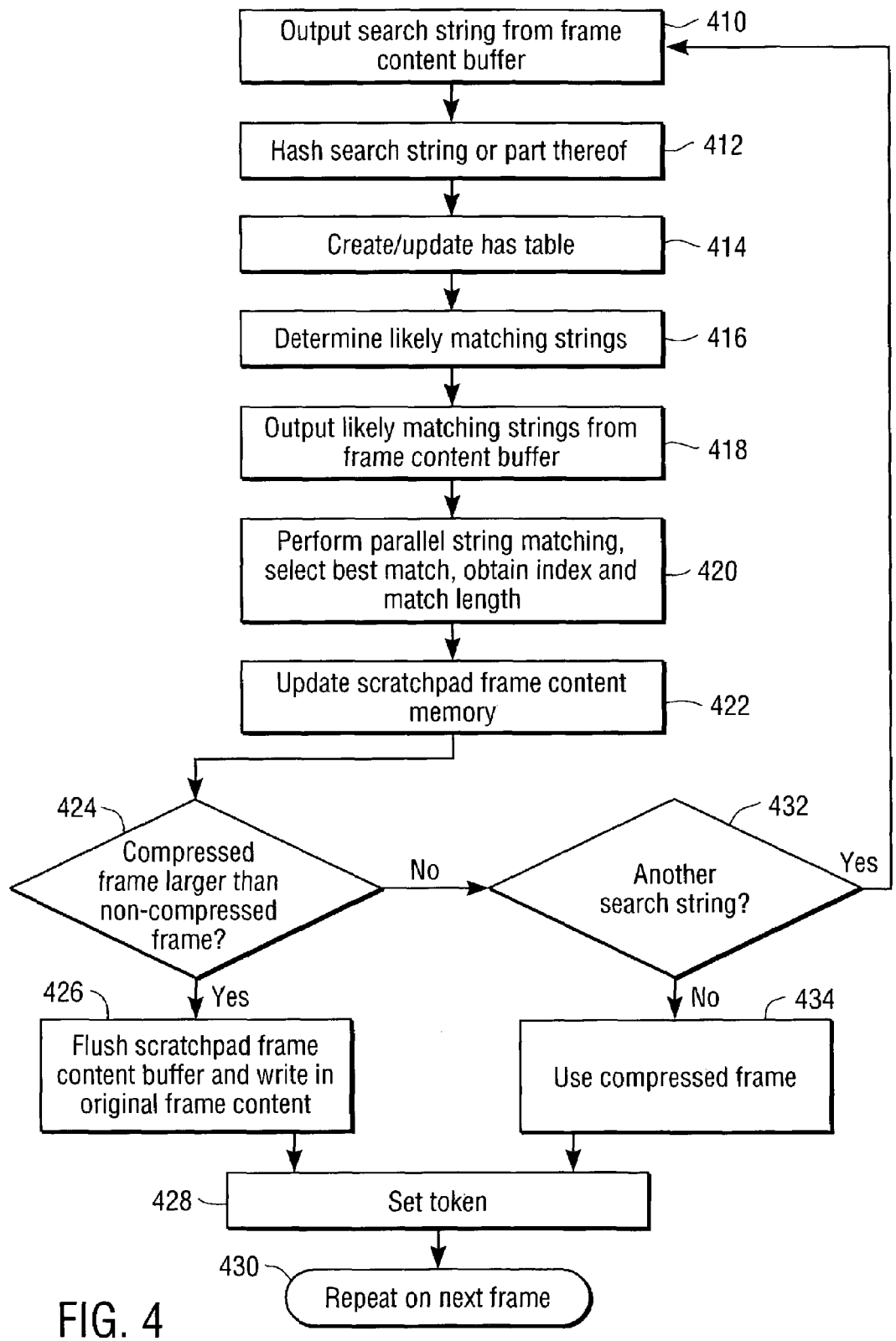
FIG. 4 illustrates a flowchart of the compression operations implemented by compression control logic according to the present invention.

FIG. 4 illustrates the sequence of operations of the compression engine 230 illustrated in FIGS. 2B and 3A-3B, and in particular with the various operations being controlled by the compression control logic block 236 illustrated in FIG. 3A. Thus, this sequence of operations, illustrated as a flow chart, is implemented in hardware using logic gates, as mentioned above. The logic signals that are generated by the compression control logic block 236, as well as the status signals received by the compression control logic block 236 in order for the control to occur, are illustrated as being passed along the control bus, indicated in FIG. 3A as "control." The specific timing of signals will vary depending upon specific implementation considerations that are beyond the scope of the invention. It is also appreciated that the preferred embodiment can be implemented in manners in which the sequence of certain operations can also change, without departing from the spirit and scope of the present invention.

Initially, in step 410, a search string from the frame content buffer 234 is output. This search string will have some length, such as between one and 10 bytes, but is has been found preferable to have the length of the search string be 3-5 bytes in length, and most preferably 4 bytes, as this offers sufficient throughput for the parallel matching operations, without increasing the area needed for the components necessary to perform the matching operations described herein. This thus allows area for other components., such as a processor that performs other functions.

The search string that is output is sent to the hash function block 238 as well as the parallel string match block 242.

In step 412 shown in FIG. 4, the hash of the search string is obtained. In practice, it has been found preferable to obtain the hash of only a part of the search string, specifically the first three out of the four bytes of the search string. The hash function used has been described previously. In step 414, the obtained hash, which using the hash function referred to above results in a nine-bit value, is then used to create and/or update the hash table 240, in a manner as also described above. Also, step 416 then follows and the obtained hash is compared with other previously entered hash values that are stored in the hash table 240, such that hashes that are the closest match will result in the selection of some number of address locations within the frame content buffer 234 corresponding to frame data that has previously been part of a search string. In the preferred embodiment, six address locations are chosen, but this number can vary, with the larger the number of address locations chosen, the greater the real estate needed in order to perform parallel match operations as described further below.

Using the address locations obtained from step 416 and stored in hash address block 244, typically in the form of an index, with a predetermined length already known, step 418 follows and match strings corresponding to the address locations are read out of the frame content buffer 234 and into the parallel match string block 242. The parallel match string block 242 will perform in step 420, in parallel, matches between the 32 bit search string and each of the six different 32 bit match strings, in the preferred embodiment, and then will select the best match, if any exists that will allow for compression of the search string. As a result, the parallel string match block 242 will output a match signal indicating that a valid match exists, and provide the length of the match (since, in the preferred embodiment, it is assumed that a match will always begin with the first search string bit).

Step 422 follows, and the scratchpad frame content buffer 248, which stores the then existing portion of the compressed frame, is updated with the results of the current search string matching.

Decision step 422 compares the size of the compressed frame in the scratchpad frame content buffer 248 with the size of the data itself in the frame content buffer 234. If the compressed frame has a larger size, it is determined not to use the compressed frame, and step 428 follows, in which the scratchpad frame content buffer 248 is flushed, and the contents of the frame content buffer 234 are written therein, by this decision it has been determined that it is advantageous to use the non-compressed frame for transmission. Accordingly, step 430 follows, in which the token that will properly set the compression flag to indicate that a non-compressed frame is being used is generated by the token generator 246. Accordingly, a header that contains the compression flag and the non-compressed frame are identified as a transmit block that will subsequently be transmitted over the wireless communication channel using the baseband and radio frequency circuitry.

Thereafter, the process is repeated for the next frame.

If, however, the result of decision step 422 is that the compressed frame has a smaller size than the non-compressed frame, step 432 follow, and it is determined if another search string exists. If so, steps 410-424 are repeated as described above for the next search string. If there is not another search string, then it is known that that it is advantageous to use the compressed frame for transmission. Accordingly, step 434 follows, in which the token that will properly set the compression flag to indicate that a compressed frame is being used is generated by the token generator 246. Accordingly, the header that contains the compression flag and the compressed frame are identified as a transmit block that will subsequently be transmitted over the wireless communication channel using the baseband and radio frequency circuitry Further, in step 434, a compression check sequence can be generated, which can then be inserted as part of the transmit block after the frame, and be used, if desired, at the receiver to check the accuracy of the decompression process, as described hereinafter.

Step 432 then again follows as the process is repeated for the next frame.

The high level diagram of FIG. 2 can be used to describe the decompression at the receiver 300 according to the present invention, since the process is much simpler. After operating upon the received transmit block to identify the header, using the received compression flag, if no compression is indicated, then the frame data is simply passed through, once having been reconstructed from the received radio frequency signal. If, however, the compression flag indicates that compression has occurred, the initial sequence of data in the frame, which will not have been compressed, is determined. Thereafter, each indication of indexing to previously received data is detected and used to reconstruct that data, which is then appended thereon, and the frame is reconstructed.

Figure 5A:
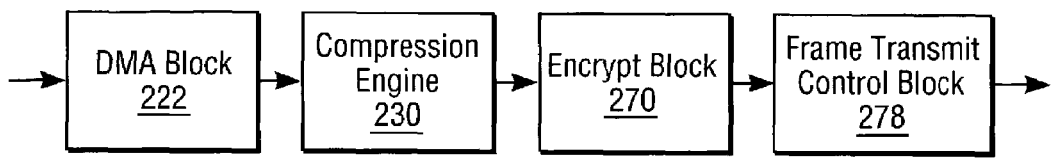
FIGS. 5A and 5B illustrate high level block diagrams of a modified transmitter and receiver according to another embodiment of the present invention.
Figure 5B:
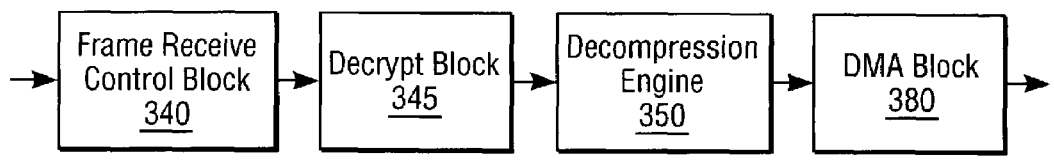

FIGS. 5A and 5B illustrate a modification to the communication system according to the present invention. As shown in FIG. 5A, transmitter 200' transmits frames of data to a receiver 300' across a wireless channel as described above, but the transmitter 200', after the compression described above by compression engine 230 being completed, and prior to the frame being indicated as being ready to transmit, the frame is encrypted using encryption block 270. Preferably a form of AES encryption is used by encryption block 270. As also illustrated in FIG. 5B, prior to decompression at the receiver 300', a decryption block 345 is used to decrypt the encrypted frame. It is understood that while the header of the frame containing the compression flag will not be compressed, whether a frame itself is compressed or not, it is possible to encrypt either only the frame, or both the frame as well as the header.

Figure 6:
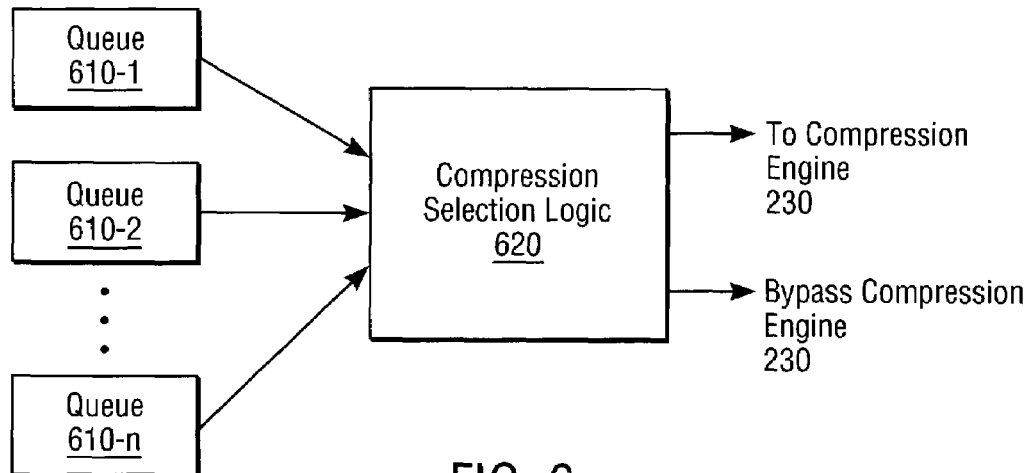
FIG. 6 illustrates queue compression selection logic according to the present invention

The above description of the present invention described that compression is attempted on every frame. A modification of the present invention can also be made such that only certain frames are compressed. For example, as illustrated in FIG. 6, different queues 610 may exist, each for holding frames of data, and all of which need to be transmitted. The data within only one or some of those queues, but not others, may be of the type such that it is desirable to attempt compression thereon. Accordingly, frames of data in certain ones of the queues, such as queue 610-1, may be operated upon by the compression engine 230, and thus determined by compression selection logic 620 to be routed to the compression engine 230, whereas frames of data in other queues, such as queue 610-2 are routed by the compression selection logic 620 to bypass the compression engine 230 to be processed as non-compressed data without any compression being attempted.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the spirit and scope of the invention as set forth in the appended claims.

What is claimed is:

1. A method of communicating digital data partitioned into a plurality of frames over a wireless communication channel, the method comprising:
   using a transmitter, identifying on which of the plurality of frames compression should be attempted;
   for each identified frame, repetitively compressing different search strings obtained from the identified frame, thereby creating a partially compressed frame;
   continuing repetitively compressing until
      either an entire frame has been compressed, thereby resulting in a compressed frame for transmission;
      or the partially compressed frame is larger than the identified frame, thereby resulting in a non-compressed frame for transmission;
   setting a compression flag in a header to:
      indicate whether the compressed frame or the non-compressed frame has resulted for the each identified frame; and
      indicate that a non-compressed frame has resulted for each frame that was not identified; and
   transmitting over the wireless communication channel a transmit block, the transmit block comprising:
      the header with a set compression flag; and
      one of the compressed frame and the non-compressed frame,
   wherein the step of repetitively compressing, for each different search string, includes the steps of:
      obtaining a hash of the search string using a hash function;
      using the hash to select a plurality of potential match strings within the identified frame, wherein using the hash includes:
         populating a hash table with the hash and a corresponding address; and
         selecting the plurality of potential match strings using the hash and a populated hash table;
      comparing each of the plurality of potential match strings with the search string to determine which potential match string will result in the most matches;
      for a potential match string that results in the most matches, identifying an index and a length to identify a location of the potential match string within the identified frame; and
      using the index and the length to create the partially compressed frame,
      wherein the search string includes a plurality of bytes, and the hash is generated using less than all of the plurality of bytes.

2. The method according to claim 1 further including the steps of:
   for each of the transmit blocks;
   determining, using the set compression flag within the header, whether the compressed frame or the non-compressed frame was transmitted;
   if the non-compressed frame was transmitted, passing the non-compressed frame to subsequent processing circuitry; and
   if the compressed frame was transmitted, decompressing the compressed frame and then passing the decompressed frame to the subsequent processing circuitry.

3. The method according to claim 1, wherein, for each of the plurality of frames identified, the hash table is regenerated.

4. A method of communicating digital data partitioned into a plurality of frames over a wireless communication channel, the method comprising:
   using a transmitter, identifying on which of the plurality of frames compression should be attempted;
   for each identified frame, repetitively compressing different search strings obtained from the identified frame, thereby creating a partially compressed frame;
   continuing repetitively compressing until
      either an entire frame has been compressed, thereby resulting in a compressed frame for transmission;
      or the partially compressed frame is larger than the identifed frame, thereby resulting in a non-compressed frame for transmission, wherein repetitively compressing includes: for each different search string, comparing, in parallel, each potential match strings with a search string to determine which potential match string will result in most matches;
      for the potential match string that results in the most matches, identifying an index and a length to identify a location of the potential match string within the identified frame; and
      using the index and the length to create the partially compressed frame;
   setting a compression flag in a header to:
      indicate whether the compressed frame or the non-compressed frame has resulted for the each identified frame, and
      indicate that a non-compressed frame has resulted for each frame that was not identified; and
   transmitting over the wireless communication channel a transmit block, the transmit block comprising:

the header with a set compression flag, the set compression flag indicating a type of compression based on a bit size of the set compression flag; and one of the compressed frame and the non-compressed frame.

5. The method according to claim 4 wherein the header within each transmit block is uncompressed.

6. The method according to claim 4 wherein, prior to the step of transmitting, there is further included the step of encrypting the transmit block.

7. An apparatus for communicating digital data partitioned into a plurality of frames over a wireless communication channel, the apparatus comprising:

Media Access Control (MAC) layer transmit circuitry, the MAC layer transmit circuitry including:

a direct memory access (DMA) block that receives a frame;

a compression engine for identifying on which of the plurality of frames compression should be attempted and, for each such frame, determining whether the frame can be compressed, for such determining, the compression engine including a plurality of parallel match logic circuits, each of the plurality of parallel match logic circuits comparing one of a plurality of search strings obtained from the frame to one of a plurality of match strings also obtained from the frame, the plurality of search strings being selected using a hash, wherein for each search string including a plurality of bytes, the hash is generated using less than all of the plurality of bytes, the compression engine updating information regarding the frame in compressed form based on results of the comparing, wherein when the frame in compressed form is larger than the frame, the compression engine indicates that a non-compressed frame is to be transmitted, wherein when the frame in compressed form is smaller than the frame, the compression engine indicates that a compressed frame is to be transmitted, and for any non-identified frame, the compression engine indicates that a non-compressed frame is to be transmitted; and a frame transmit control block for controlling when to transmit the compressed/non-compressed frame;

baseband transmit circuitry that receives the compressed/non-compressed frame for transmission and generates a baseband signal therefrom; and radio frequency transmit circuitry that receives the baseband signal and generates a radio frequency signal therefrom, wherein the compression engine includes:

a frame content buffer for storing the frame;

a hash function block that obtains a hash of each of the plurality of search strings;

a hash table that is populated with at least some hashes of the plurality of search strings and is used to determine addresses from which to obtain the plurality of match strings; and compression control logic that controls a sequence of operations using the hash function block, the hash table, and the parallel match logic circuits.

8. The apparatus according to claim 7 wherein:

the compression engine repetitively compresses using different ones of the plurality of search strings obtained from the frame and the parallel match logic circuits to determine best matches between each search string and the match strings, and wherein each best match is used to create a partially compressed frame; and further including a scratchpad buffer for storing the partially compressed frame.

9. The apparatus according to claim 7 wherein the compression engine further includes:

a frame content buffer that stores the frame; and compression control logic that controls reading of the plurality of search strings and the match strings from the frame content buffer and providing the plurality of search strings and the match strings to the parallel match logic circuits.

10. The apparatus according to claim 7, formed on a single integrated circuit chip.

11. The apparatus according to claim 7, further including a processor that performs operations other than the compression that is performed by the compression engine.

12. The apparatus according to claim 7, wherein the processor operates based upon received instructions, and the compression engine does not operate based upon received instructions.

* * * * *